United States Patent
Huntsman

(10) Patent No.: US 12,246,671 B2
(45) Date of Patent: Mar. 11, 2025

(54) AIRBAG INFLATOR FILTER USING EXPANDED METAL ORIENTED ROUGH SIDE FACING TOWARD THE INSIDE DIAMETER OF THE FILTER

(71) Applicant: ACS Industries, Inc., Lincoln, RI (US)

(72) Inventor: Steven D. Huntsman, North Ogden, UT (US)

(73) Assignee: ACS Industries, Inc., Lincoln, RI (US)

(*) Notice: Subject to any disclaimer, the term of this patent is extended or adjusted under 35 U.S.C. 154(b) by 0 days.

(21) Appl. No.: 18/549,961

(22) PCT Filed: Feb. 21, 2022

(86) PCT No.: PCT/US2022/017131
§ 371 (c)(1),
(2) Date: Sep. 11, 2023

(87) PCT Pub. No.: WO2022/191981
PCT Pub. Date: Sep. 15, 2022

(65) Prior Publication Data
US 2024/0149825 A1 May 9, 2024

Related U.S. Application Data
(60) Provisional application No. 63/160,053, filed on Mar. 12, 2021.

(51) Int. Cl.
| B60R 21/264 | (2006.01) |
|---|---|
| B01D 39/12 | (2006.01) |
| B60R 21/26 | (2011.01) |

(52) U.S. Cl.
CPC ........ B60R 21/2644 (2013.01); B01D 39/12 (2013.01); *B01D 2239/0695* (2013.01);
(Continued)

(58) Field of Classification Search
CPC ............... B01D 2279/10; B01D 39/12; B01D 2239/10; B01D 2239/0695; B60R 2021/26011; B60R 21/2644
See application file for complete search history.

(56) References Cited

U.S. PATENT DOCUMENTS
| 7,823,919 B2 | 11/2010 | Jackson |
|---|---|---|
| 9,700,825 B2 | 7/2017 | Greenwood |
(Continued)

FOREIGN PATENT DOCUMENTS
| CN | 117339307 A | * | 1/2024 |
|---|---|---|---|
| JP | 2016055669 A2 | | 4/2016 |

*Primary Examiner* — Paul N Dickson
*Assistant Examiner* — Matthew D Lee
(74) *Attorney, Agent, or Firm* — Hinckley Allen & Snyder; Stephen Holmes

(57) ABSTRACT

A flattened expanded metal strip (9) is wrapped into an airbag inflator filter (21) with the strip oriented such that the flattened rough side (17) of the strip is pointing toward the inside diameter (ID) of the filter and the flattened smooth side (15) is pointing towards the outside diameter (OD). With this orientation, the filter (21) is able to capture more slag than filters made using the standard wrapping method in which the smooth side is oriented inward. The expanded metal can be of various types including, for example, variable expanded metal (VEM) or standard expanded metal (SEM).

20 Claims, 7 Drawing Sheets

(52) U.S. Cl.
CPC ............ *B01D 2239/10* (2013.01); *B01D 2239/1291* (2013.01); *B01D 2279/10* (2013.01); *B60R 2021/26011* (2013.01)

(56) References Cited

U.S. PATENT DOCUMENTS

| | | | |
|---|---|---|---|
| 2004/0244345 A1* | 12/2004 | Endo | F01N 3/0222 |
| | | | 55/525 |
| 2010/0146922 A1 | 6/2010 | Greenwood | |
| 2012/0067015 A1* | 3/2012 | Greenwood | B01D 39/12 |
| | | | 55/525 |
| 2013/0291756 A1 | 11/2013 | Uhsugi | |
| 2018/0229687 A1* | 8/2018 | Adamczyk | B01D 39/2027 |
| 2020/0316512 A1 | 10/2020 | Greenwood | |
| 2021/0023487 A1* | 1/2021 | Hoffman | B60R 21/2644 |

\* cited by examiner

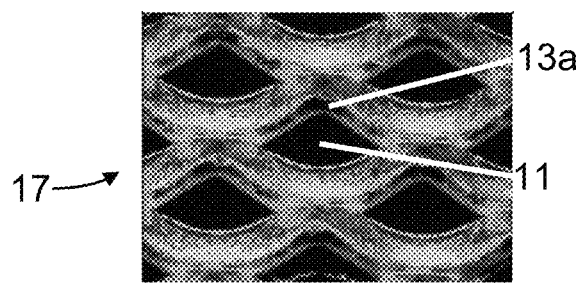
FIG. 4A
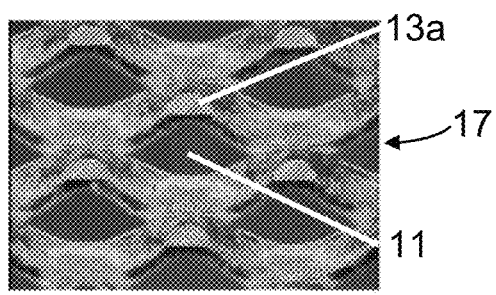 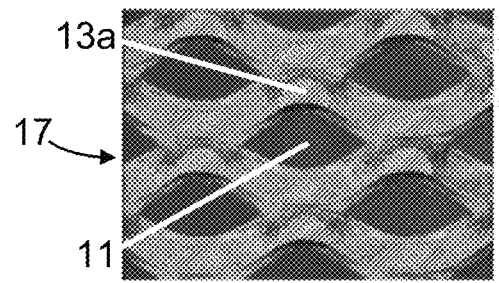
FIG. 4B                FIG. 4C
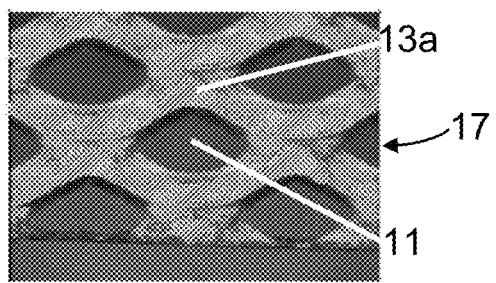 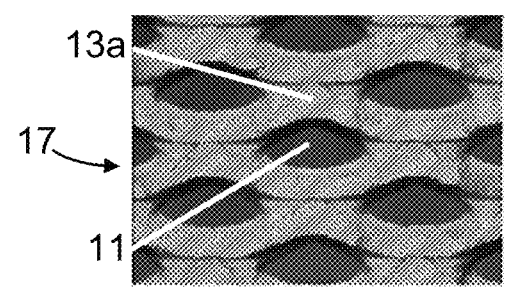
FIG. 4D                FIG. 4E

AIRBAG INFLATOR FILTER USING EXPANDED METAL ORIENTED ROUGH SIDE FACING TOWARD THE INSIDE DIAMETER OF THE FILTER

FIELD OF THE INVENTION

This disclosure relates to vehicle safety and, in particular, to filters for airbag inflators where the filter is made, at least in part, from expanded metal.

BACKGROUND AND TERMINOLOGY

A. Expanded Metal

Expanded metal has found a variety of uses, from mats used for fighting fires to filters for airbag inflators. Expanded metal can be made in a variety of ways. For example, expanded metal can be made by taking a sheet of metal, puncturing the sheet to produce a multiplicity of slits, and pulling the sheet perpendicular to the direction of the slit to elongate the slit and provide an opening in the sheet. Another common method for making expanded metal is by piercing and cold forming openings, which are often called "diamonds" because of their final shape. The final length of the sheet, with the accompanying holes, is longer than the original and so it is expanded, as well as the openings formed being expanded.

Thus, although the details will vary depending on the specific process, expanded metal sheets are typically made by using a row of teeth or bits in a punch to produce perforations in the sheet. The side of the sheet facing the punch (smooth side) will have an indentation around the perforation, and the reverse side of the sheet (rough side) will have a corresponding raised portion, a burr, around the perforation. In accordance with the present disclosure, it has been discovered that burrs are also formed on the smooth side of the sheet. These burrs are substantially smaller than those formed on the rough side. In particular, while the burrs on the rough side are large enough to exhibit a "cheese grater" effect if they come into contact with an inflator's solid propellant (see discussion below), the burrs on the smooth side are too small to exhibit this effect at a commercially unacceptable level. To distinguish the two types of burrs, those on the rough side will be referred to herein as "rough side expanded-metal burrs" while those on the smooth side will be referred to as "smooth side expanded-metal burrs."

As used herein, the side of an expanded metal sheet that does not include rough side expanded-metal burrs will be referred to as the sheet's "smooth side," and the side of the sheet that includes rough side expanded-metal burrs will be referred to as the sheet's "rough side." This terminology is illustrated in FIG. 1, where 9 is the expanded metal sheet, 11 are perforations in the expanded metal sheet, 13a are rough side expanded-metal burrs, 13b are smooth side expanded-metal burrs, 15 is the expanded metal sheet's smooth side, and 17 is the expanded metal sheet's rough side. As will be discussed and quantified below, in certain embodiments, the flattened rough sides of the expanded metal of the filters of the present disclosure are at least somewhat rougher than the flattened smooth sides.

B. Filters for Airbag Inflators

Filters for airbag inflators need to satisfy a number of demanding criteria. Such filters serve to capture the extensive debris (slag) that is generated during the rapid burning of an airbag's solid propellant. The slag can damage the airbag and if released from the airbag can injure occupants of the vehicle in which the airbag deployed. In addition, the slag is often chemically harmful to humans. To address these concerns, manufacturers of airbag inflators have developed strict standards for the amount of slag that can be emitted from an airbag inflator upon activation. The standard in the U.S. for airbag assemblies of all types is a maximum of 1,000 milligrams of total particulates (total slag) reaching the airbag cushion as a result of a deployment of an airbag assembly.

In order for an airbag inflator to meet this standard, its filter needs to be highly effective in its filtering function. Yet, it must also allow the gas generated by the burning of the solid propellant to quickly reach and inflate the airbag. That is, the filter cannot generate excessive levels of backpressure. Moreover, the filter needs to satisfy these conflicting criteria, i.e., effective filtering with low backpressure, in the midst of the high forces produced by the rapid burning of the solid propellant. Besides these criteria, the filter also serves as a diffuser to attain a more even flow of the expanding gases entering the airbag and as a heat sink to help reduce the temperature of the gases so that they will not harm the airbag or the person being protected by the airbag.

In addition to these considerations, cost is always an issue for a mass-produced item, especially one used in the automotive field. Expanded metal has advantages compared to other filter materials in this regard because the process of expanding the metal reduces the amount of raw material (sheet metal) contained in each filter and thus the cost of the filter. The lower metal content also reduces the filter's weight which is desirable in terms of improving gas mileage and thus lowering vehicle emissions.

As shown in FIG. 2, a common configuration for an airbag filter is a tube 21 having an inner surface 22 which defines a central bore or cavity 23, an outer surface 24, and substantially flat end sections 25 which extend between the inner surface 22 and the outer surface 24. In the assembled inflator, the bore of the filter typically houses some and, in many cases, all of the inflator's solid propellant 26. The solid propellant is typically in the form of compressed pellets of a pyrotechnic composition. The pellets are packed in the filter's bore and, at least to some extent, can move (vibrate) within the bore as the result of the forces that the airbag inflator is subject to during use of the vehicle. Although quite tough, the pellets are susceptible to at least some physical degradation through contact with, for example, a rough surface. This physical degradation, in turn, translates into performance changes for the airbag inflator.

Once installed in a vehicle, airbag inflators have service lives of at least 20 years. The inflator and its contents, including its solid propellant, are thus subject to years of vibration. To avoid substantial degradation of the solid propellant as a result of this vibration, it has been an absolute rule for airbag filters employing expanded metal that the rough side of the expanded metal must face outward so that only the smooth side can come into contact with the solid propellant. The fear has been that the rough side will act as a "cheese grater" and thus degrade the solid propellant over time. Indeed, to ensure that mistakes regarding the orientation of the rough and smooth sides are not made, a coloring has been applied to the smooth side of the expanded metal so that in the finished filter it can easily be visually confirmed that the smooth side is inward and forms the filter's inner surface.

SUMMARY OF THE DISCLOSURE

As will be described in detail below, contrary to the conventional wisdom, it has been surprisingly found that the rough side of expanded metal can form the inner surface of an airbag filter without leading to unacceptable levels of degradation of an inflator's solid propellant provided that the expanded metal has been subjected to a sufficient amount of flattening to reduce its roughness. Even more surprising, it has been found that with the flattened rough side oriented inward, the filter becomes substantially better at capturing the slag produced by the burning of the solid propellant, provided that the expanded metal has not been subjected to too much flattening. As described fully below, it has been discovered that reductions in the range of 25-45% in the expanded metal thickness can achieve this desired combination of enhanced slag capture without compromising an inflator's service life.

In an aspect, a method of making a filter for an airbag inflator is provided which comprises:
 (I) providing a sheet of expanded metal which has a smooth side and a rough side;
 (II) flattening the sheet of expanded metal, the flattening reducing the thickness of the sheet;
 (III) forming a strip of flattened expanded metal from the flattened sheet of expanded metal; and
 (IV) forming the filter by a method that comprises wrapping the strip of flattened expanded metal about an axis;
wherein:
 (a) the filter has an cavity for receiving a solid propellant, said cavity having a surface that is capable of coming into contact with the solid propellant in an assembled airbag inflator;
 (b) the flattened strip of expanded metal comprises a flattened rough side; and
 (c) the flattened strip of expanded metal is wrapped so that at least a part of said surface of the cavity comprises a portion of the flattened rough side.

In an aspect, a filter for an airbag inflator is provided which comprises a strip of expanded metal rolled-up about an axis to form multiple rolled layers said filter comprising a cavity for receiving a solid propellant said cavity having a surface that is capable of coming into contact with the solid propellant in an assembled airbag inflator, wherein:
 (a) the strip of expanded metal comprises a flattened smooth side and a flattened rough side; and
 (b) the strip of expanded metal is rolled-up so that (i) the flattened rough side faces inward towards the cavity and (ii) at least a part of the surface of the cavity comprises a portion of the flattened rough side.

In an aspect, apparatus for helping to protect an occupant of a vehicle is provided which comprises:
 (I) an inflatable vehicle occupant protection device; and
 (II) an inflator that is actuatable to provide inflation fluid for inflating the inflatable vehicle occupant protection device;
wherein the inflator comprises:
 (A) a solid propellant that is susceptible to degradation through contact with a rough surface; and
 (B) a filter that comprises a flattened strip of expanded metal rolled-up about an axis to form multiple rolled layers, said filter having an inner surface and an outer surface;
wherein:
 (i) the flattened strip of expanded metal has a flattened smooth side and a flattened rough side;
 (ii) the flattened strip of expanded metal is rolled-up so that the strip's flattened smooth side is outward and its flattened rough side is inward;
 (iii) at least part of the filter's inner surface comprises the flattened rough side; and
 (iv) at least part of the solid propellant and the filter's inner surface are in contact in the assembled inflator, said contact occurring prior to actuation of the inflator.

Additional properties and advantages of the technology disclosed herein are set forth in the detailed description that follows, and in part will be readily apparent to those skilled in the art from that description or recognized by practicing the technology as described herein. The accompanying drawings are included to provide a further understanding of the technology, and are incorporated in and constitute a part of this specification. It is to be understood that the various aspects of the technology disclosed in this specification and in the drawings can be used individually and in any and all combinations. It is also to be understood that the general description set forth above and the detailed description which follows are merely exemplary of the invention and are intended to provide an overview or framework for understanding the nature and character of the invention as defined by the claims.

BRIEF DESCRIPTION OF THE DRAWING FIGURES

FIG. 1 is a schematic depiction of an un-flattened expanded metal sheet showing the sheet's smooth and rough sides, the rough side being characterized by the presence of burrs formed by the expansion process which are sufficiently large to degrade an inflator's solid propellant through the cheese grater effect. The smooth side has also been found to have burrs but these are substantially smaller than the rough side burrs and thus do not result in unacceptable levels of degradation of the solid propellant. FIG. 1A is a cross-sectional view and FIG. 1B is a plan view of the sheet's rough side.

FIG. 2 is a schematic depiction of an airbag filter according to an embodiment of the disclosure in which the filter is in the form of a tube having an inner surface which defines a central bore or cavity, an outer surface, and substantially flat end sections which extend between the inner surface and the outer surface. Pellets of a pyrotechnic composition are located within the bore of the filter where they can come into contact with the filter's inner surface.

FIG. 3 is a schematic depiction of an embodiment for making an expanded metal sheet and a filter from strips formed from the sheet.

FIG. 4 is a set of photomicrographs showing the rough sides of expanded metal sheets which have undergone different amounts of flattening. FIG. 4A shows an un-flattened sheet, while FIGS. 4B, 4C, 4D, and 4E show sheets whose thicknesses have been reduced by 21%, 33%, 45%, and 55%, respectively. In terms of scale, the distance between the left and right corners of perforations 11 in this figure is 33 thousands. This scale also applies to FIGS. 5-7.

FIG. 5 is a set of photomicrographs showing the smooth sides of expanded metal sheets which have undergone different amounts of flattening. FIG. 5A shows an un-flattened sheet, while

FIG. 6 is a set of photomicrographs showing the effects of different amounts of flattening on pairs of neighboring burrs of an expanded metal sheet. FIG. 6A shows un-flattened burrs, while

7, the five panels of FIG. 5 as the middle column, and the five panels of FIG. 6 as the right-hand panel. The montage highlights the differences in the surface structure of the expanded metal sheet with different amounts of flattening.

Figure 8:
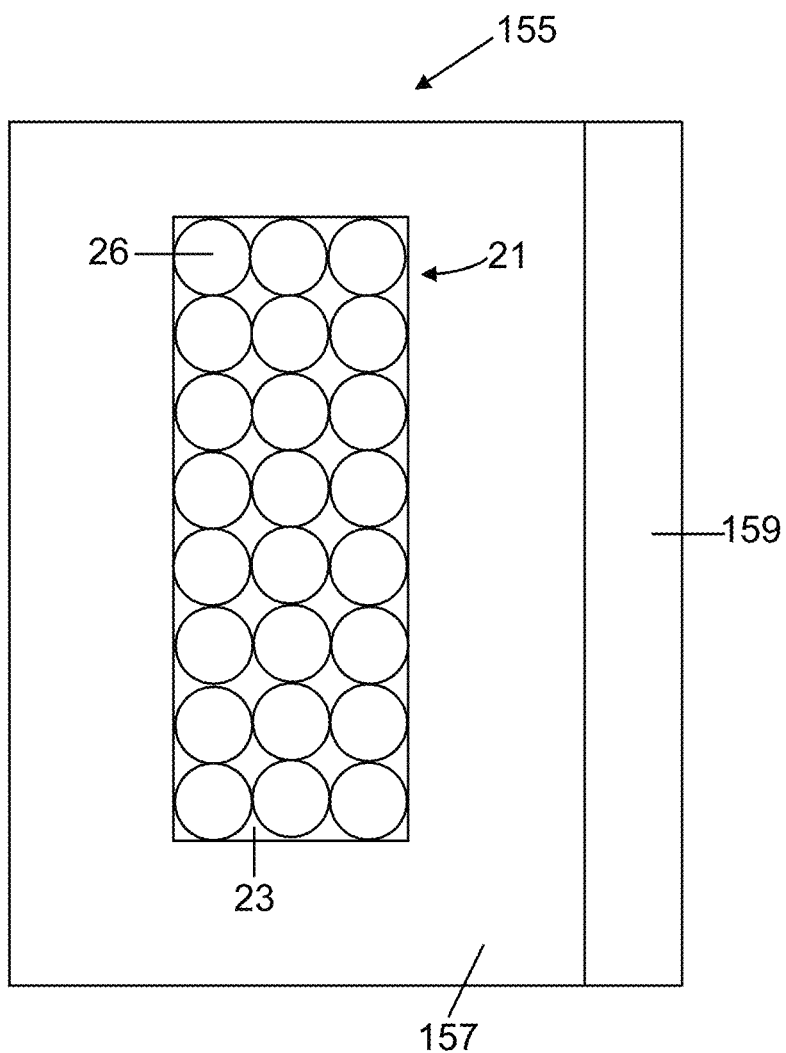

FIG. 8 is a schematic depiction of an airbag assembly

The reference numbers used in the figures correspond to the following:

9 expanded metal sheet
11 perforations in the expanded metal sheet
13*a* expanded-metal burrs—rough side
13*b* expanded-metal burrs—smooth side
15 expanded metal sheet's smooth side
17 expanded metal sheet's rough side
21 substantially cylindrical filter
22 substantially cylindrical inner surface of filter 21
23 cavity of filter 21 defined by inner surface 22
24 substantially cylindrical outer surface of filter 21
25 substantially flat end sections of filter 21
26 solid propellant
101 roll of metal sheet
103 press
105 punch
107 teeth or bits
109 stretcher
111 camera
113 computer controller
115 monitor
121 rollers
123 cutter
125 expanded metal strip
127 expanded metal strip
129 welder
131 cylinder
133 welder
135 welded mesh cylinder
137 female mold
139 mandrel
141 wall of perforation 11 (smooth side)
143 wall of perforation 11 (smooth side)
145 concave barrier (rough side)
147 concave barrier (rough side)
149 three-dimensional gorge in concave barrier (rough side)
151 sharp corner (rough side)
153 rounded corner (rough side)
155 airbag assembly
157 inflator
159 inflatable vehicle occupant protection device

DETAILED DESCRIPTION OF THE PREFERRED EMBODIMENTS

As discussed above, airbag filters have historically always been wrapped smooth side facing inward because in a commonly-used airbag configuration, the inflator's filter is in direct contact with the inflator's solid gas-generating propellant pellets (also know as tablets). The pellets are susceptible to degradation as a result of vibration because anything that is rough can scrape the surfaces of the pellets which can degrade the inflator's performance and/or make the inflator more dangerous. If the smooth side of the filter's expanded metal is wrapped facing outward and the rough side is facing inward, then the expanded metal can act exactly like a cheese grader on the solid propellant. Thus, in the past, all pyrotechnic airbag manufactures have prohibited the wrapping of filters made of expanded metal with the rough side of the expanded metal facing inward.

During a deployment of an airbag inflator, the gas that fills up the airbag is generated by a solid rocket fuel, which is, most commonly, based on guanidine nitrate. The propellant is normally highly loaded with copper and other metals, which in some cases can constitute 60% or more of the overall composition. During an airbag inflator deployment, the metals in the propellant liquefy and become entrained in the gas produced by the burning of the propellant. In this very dynamic system, this phase change from a solid to a liquid happens in a few dozen milliseconds.

The inflator filter's job is to thermodynamically diffuse and cool the hot burning gas such that the liquid copper and other metals are transformed back into the solid phase so that they can be captured in the filter, with only the cooled gas escaping. Car companies are very concerned with the amount of slag coming out of the inflator. If an inflator puts out more than 1 total gram of residues and/or airborne particulates (collectively, slag) then the inflator will be rejected by car companies for not meeting the USCAR standards established by NHTSA and other safety automotive groups to protect asthmatic occupants and others susceptible to health problems from exposure to airborne particulates.

In accordance with an aspect of the present disclosure, an expanded metal sheet, once formed, is flattened by running the sheet through a set of, for example, calendar rollers to smooth out the sheet's rough side so that pellets of the inflator's propellant will not degrade unacceptably as a result of contact with the rough side. The flattening should be enough so that from a cheese grader standpoint, the flattened smooth side and the flattened rough side of the expanded metal sheet are nearly identical. That is, the flattened rough side should grind down the inflator's pellets no faster than is normal for an un-flattened smooth side. Car companies require their inflator part suppliers to test for grinding down of an inflator's pellets by vibrational environmental testing in a laboratory. The testing is designed to replicate extended or long term vibrations in a vehicle. In an embodiment, when so tested, the flattened rough side is smooth enough so that when it forms the wall of the filter's cavity it does not degrade the inflator's pellets any faster than is normal for filters where the smooth side forms the cavity's wall. In an embodiment, after flattening both the flattened rough side and the flattened smooth side will be smooth to the touch.

Surprisingly, even though it has been flattened, by orienting the flattened rough side so that it points inward, i.e., so that it faces into the gas flow direction, more efficient cleaning is obtained than when the flattened smooth side points inward. Although not wishing to be bound by any particular theory of operation, it is believed that the flattened rough side expanded-metal burrs create slag capturing pockets at every perforation that are able to capture the slag produced by the burning propellant at a fast rate. That is, the rough fins (burrs) of the expanded metal, even though flattened, act like a little army of internal capturing pockets. Consequently, much cleaner gas filtrations can be achieved by wrapping an expanded metal filter with its flattened smooth side facing out and its flattened rough side facing in.

Figure 1A:
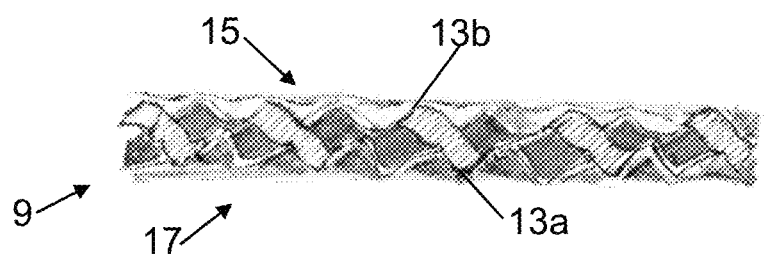
Figure 1B:
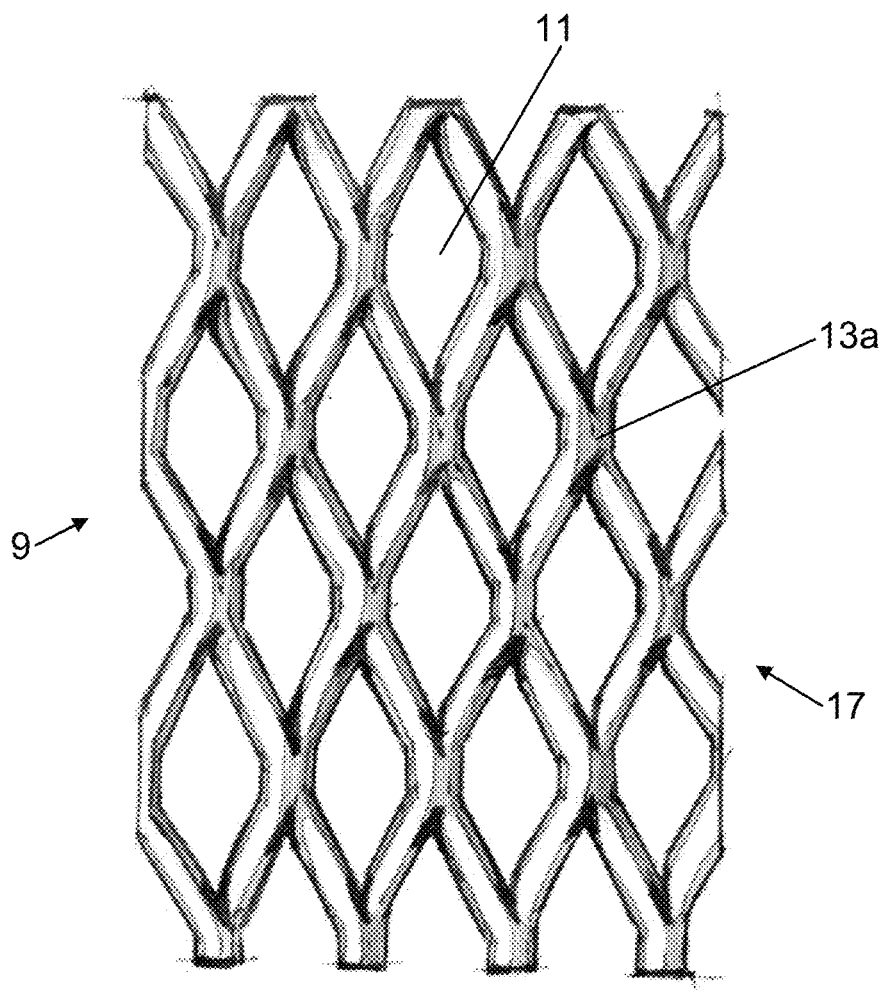
Figure 2:
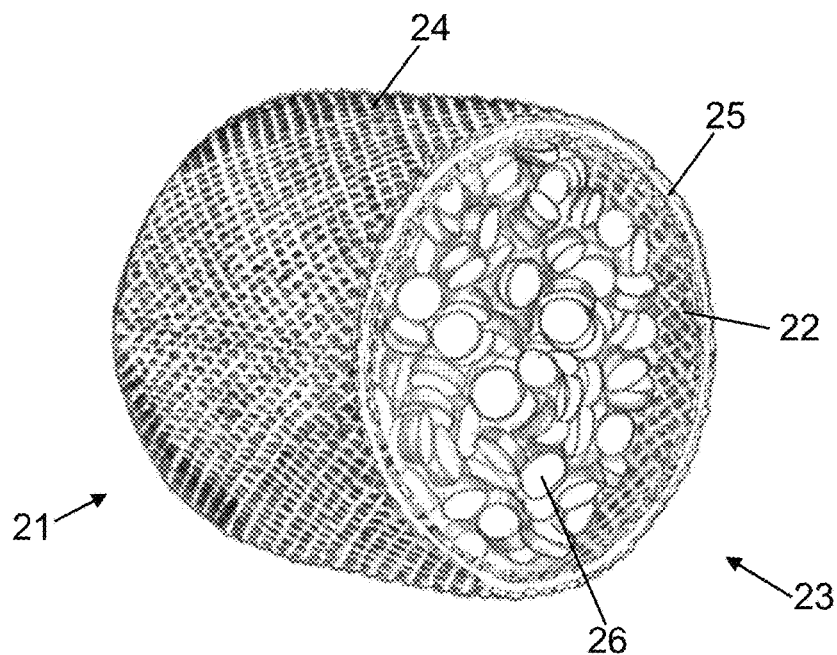
Figure 3:
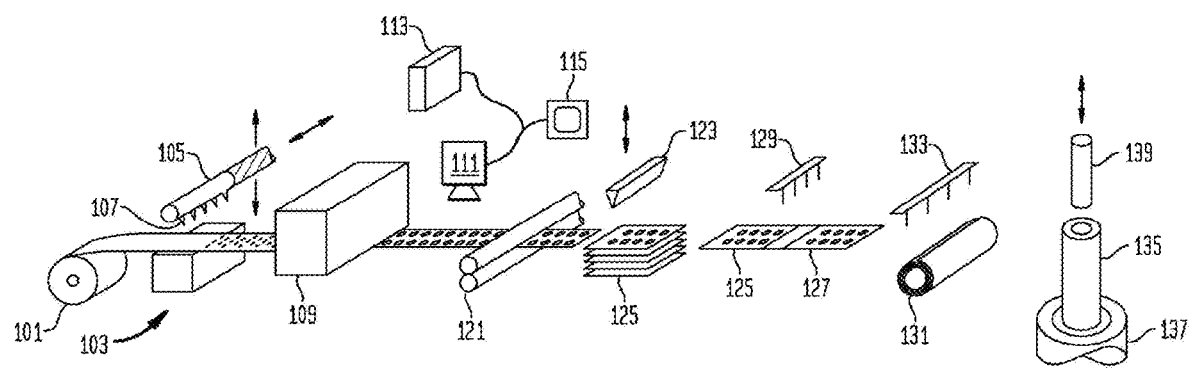

With reference now to FIG. 3, the manufacture of an expanded metal sheet according to certain aspects of this disclosure starts with a roll of metal sheet 101 (for example, about nineteen inches wide, which can be cut down to between two to six inches for making filters for passenger airbags and to about 1.5 inches for driver airbags, although any width can be used depending on the equipment). For filters for airbag inflators, stainless steel, such as SS304, 309, 310, 409, 410, or 430 can be used. Carbon steel from C1006 to C1008 is often preferred for various applications. Depending on the environment in which the expanded metal is used, other metal compositions available in a sheet form can be used.

The sheet is fed first to a press 103 in which a punch 105 having a number of teeth or bits 107 is moved into the sheet so that the teeth perforate the sheet and then the punch is removed, just as in a stamping operation. The geometry of the bits, which are preferably identical to each other, is preferably such that a slit is formed in the sheet. Depending on the geometry of the bit, the depth of penetration of the bit will determine the length of the slit formed; the deeper the penetration, the longer the slit, and thus the more open the final structure can be after stretching. While shown with a single punch, multiple punches can be used to provide different perforation spacings, geometries, and/or depths. For airbag inflator filters, the opening is made to a size based on the airbag manufacturer's specifications for the open area of the sheet, the porosity of the sheet, or other parameter(s) required for the filter.

The sheet is advanced preferably by a servo motor (not shown) or other mechanism whereby the longitudinal advance of the sheet can be precisely controlled. The advance of the sheet is preferably in discrete steps so that the sheet is stationary when punched. Although not preferred, a roller with teeth can be used in a continuously moved sheet.

The perforated sheet produced in the press is then fed to a stretcher 109 in which differential rollers stretch the perforated sheet in the axial direction (that is, along the direction of travel) so that the slits are opened into diamond-shaped holes. (Of course, a hexagonal bit can be used to make hexagonal openings, or other bit geometries, can be used, but slits formed into diamonds is a common shape.)

Figure 7:
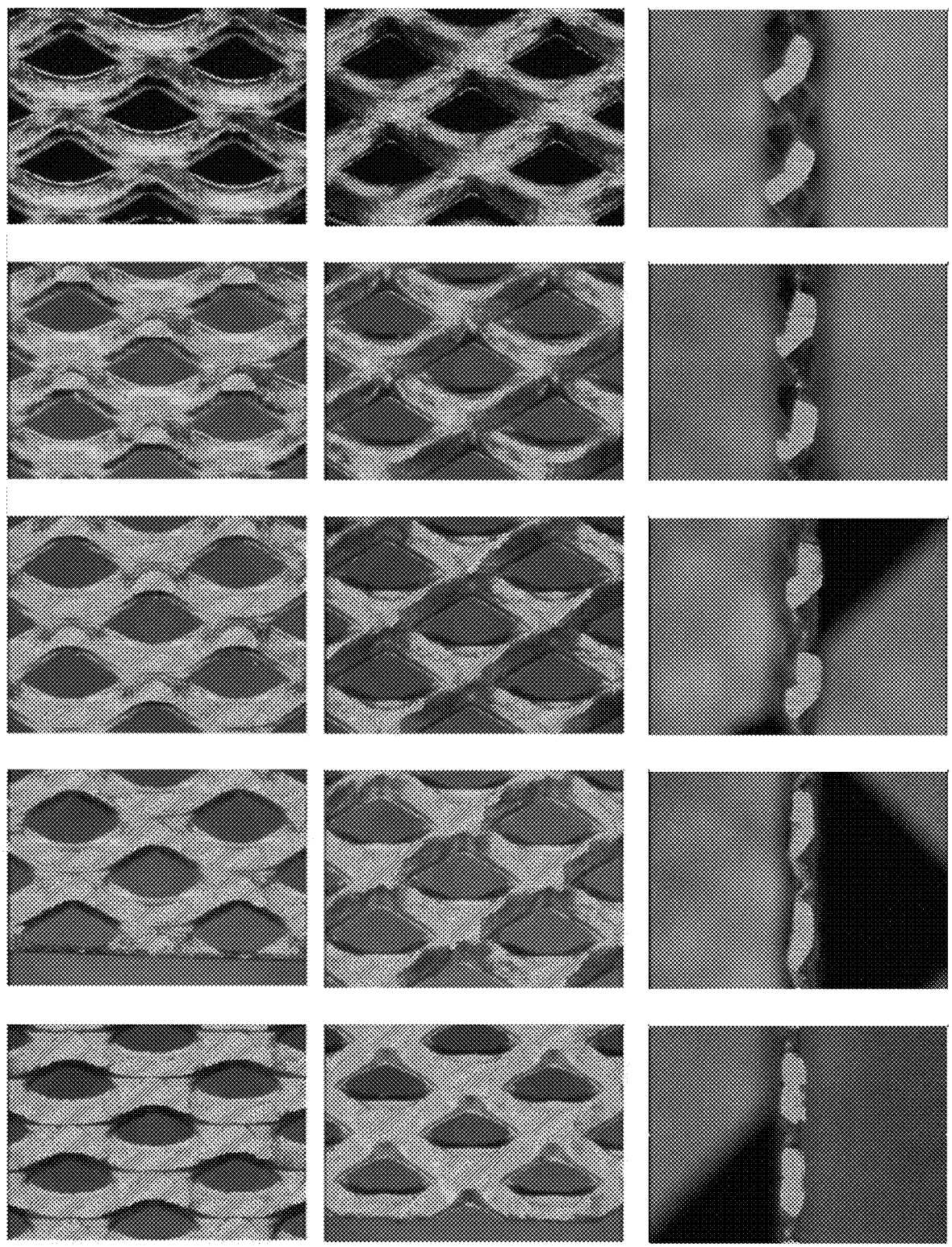
FIG. 7 is a montage of FIGS. 4-6. Specifically, the five panels of FIG. 4 are repeated as the left-hand column of FIG.

Although slitting and stretching can be performed as separate operations, when fine patterns are to be formed, it is often preferable to produce the expanded metal sheets by performing slitting and stretching with the same teeth in the same motion. During this operation, the material hangs out over a flattened bottom blade and angled upper teeth or bits slit the sheet and then continue into the sheet. The sheet bends down and the angle formed by this bending as it relates to the teeth causes a stretching motion of the sheet. Consequently, the sheet is stretched more or less by the depth of the tooth penetrations. The amount of stretching achieved in this way is typically in the range of 20-25% and can be as much as 37%. Compared to the slit-and-stretch approach, the one step approach produces perforations (openings) that have a shape more like that of a triangle than a diamond (see FIGS. 4-5 and 7). As with the separate slitting and stretching approach, the one step approach forms openings by (i) forming slits in a sheet of metal and (ii) stretching the slits in the direction of the metal's longitudinal axis, but does so in one step, rather than two.

A video control system including at least one camera 111, which is connected with a computer controller 113 running software, and an optional monitor 115, examines the holes or open area, and can learn (after parameters are input to the controller) whether the perforations are within specification. The controller's software checks the opening sizes and/or shapes (geometry) to determine whether the individual openings, or open area (actual or estimated or calculated), are within specification. A second camera (not shown) can be placed between the punch and the stretcher to determine whether the initial punching is within specification. The video control system performs an optical inspection of the expanded metal sheet product and determines whether the product is within specification. To alter the process to get on, return to, or change the specification, the advance of the sheet can be altered by adjusting the servo motor (via the computer controller) to change the longitudinal spacing of the perforations. The stretcher can also be adjusted to increase or decrease the amount the perforated sheet is stretched.

Once formed, the expanded metal sheet is flattened by, for example, one or a pair 121 of rollers. If desired, the expanded metal sheet can be passed through multiple pairs of rollers to achieve the desired degree of flattening. Based on their knowledge of the art and this disclosure, skilled workers will readily be able to select roller configurations suitable for achieving the levels of flattening discussed herein. As discussed above, in accordance with the disclosure, the amount of flattening is selected to achieve enhanced slag capture without compromising an inflator's service life as a result of degradation of the inflator's solid propellant through the cheese grater effect. With reference again to FIG. 3, a video control system camera 111 can be located after the flattening step and used to determine if the degree of flattening is within specifications.

Figure 5A:
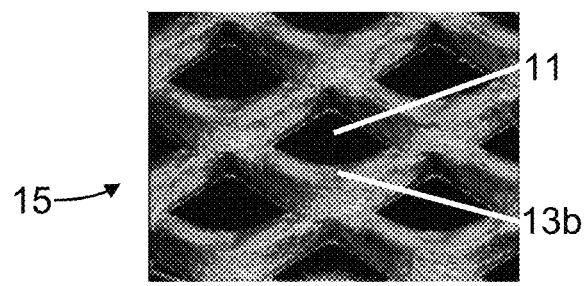
Figure 5B:
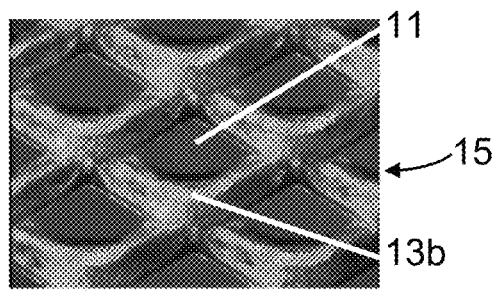
FIGS. 5B, 5C, 5D, and 5E show sheets whose thicknesses have been reduced by 21%, 33%, 45%, and 55%, respectively.
Figure 5C:
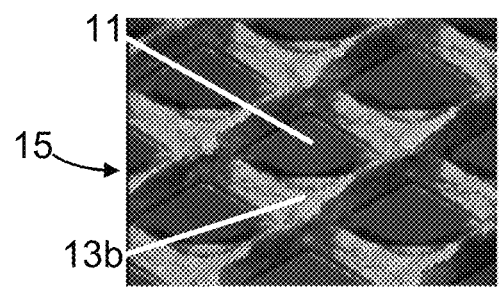
Figure 5D:
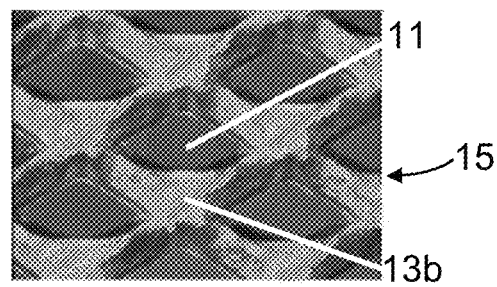
Figure 5E:
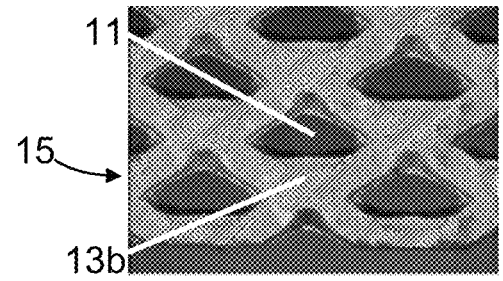

FIG. 4A is a photomicrograph of the rough side 17 of a sheet of expanded metal produced by the one-step expanding process described above. The figure shows the rough side prior to flattening. As can be seen, perforations 11 in the sheet have a generally triangular shape. For this manufacturing process, the expanded-metal burrs on the rough side are largest along the intersecting short sides of the triangles. These rough side burrs have been labeled 13a in FIG. 4. FIG. 5A is a photomicrograph of the corresponding smooth side 15 of the sheet, again prior to flattening. This surface also exhibits burrs, but they are smaller and are located on the long sides of the triangles. These smooth side burrs have been labeled 13b in FIG. 5.

The expanding process increases the thickness of the sheet by, for example, two times, the exact amount depending on the particulars of the process, the perforation pattern being formed, and the thickness of the base material. As one example, for the expanded metal of FIGS. 4-7, the base material had a thickness of 0.015 inches (15 thousandths) and the expanding process increased the sheet thickness by more than two times, i.e., after expanding and prior to flattening the sheet as shown in FIGS. 4A and 5A had a thickness of 0.033 inches (33 thousandths).

As noted above, the thickness of the expanded metal sheet prior to flattening will depend on the thickness of the base material and the amount by which the based material is expanded. The thickness after flattening will depend on the amount of flattening applied to the expanded sheet. In an embodiment, the amount of flattening needed to achieve enhanced slag capture without compromising an inflator's service life as a result of the cheese grater effect can be expressed in terms of a percentage reduction in the pre-flattened thickness t of the expanded metal sheet resulting from the flattening, e.g., in an embodiment, the thickness reduction can be in the range of 25-45% which for an expanded metal sheet having a pre-flattened thickness of 33 thousandths, corresponds to a post-flattening thickness in the range of 25 to 18 thousandths, respectively.

In certain embodiments, the thickness reduction is in the range of 30-45% or in the range of 30-40% or in the range of 30-35%. The percentage ranges referred to herein and in the claims include the endpoints of the ranges. The lower and upper endpoints can be used in other combinations such as 25-40% and 25-35%. Expanded metal exhibits a spring-back effect after flattening wherein the final thickness of the sheet ends up somewhat greater than the spacing between the rollers used for flattening. The post-flattening thicknesses to be used in calculating the percentage reduction is the final thickness after spring-back.

Sheet thicknesses both before and after flattening can, for example, be measured at multiple locations on the sheet using calipers and then averaged. Instead of using calipers, which will typically extend over multiple perforations in the sheet, a micrometer can be used at individual perforations with the measurements again being averaged for multiple locations on the sheet. Because the improvements achieved by this technology depend on a percentage reduction in sheet thickness, it normally does not matter which measuring technique is used provided the same technique is used for the pre-flattened and post-flattened measurements. However, in case of a conflict, micrometer measurements are preferred because of their higher accuracy.

FIGS. 4B-4E show the effects of different amounts of flattening on the rough side burrs 13a of FIG. 4A, while FIGS. 5B-5E show the effects on the smooth side burrs 13b of FIG. 5A. Hatching has been used in these figures to make the effect of the flattening more visible. The flattened sheet thickness was 26 thousandths in the B panels, 22 thousandths in the C panels, 18 thousandths in the D panels, and 15 thousandths in the E panels. These post-flattening thicknesses correspond to reductions in the sheet's pre-flattening thickness (i.e., 33 thousandths) of 21%, 33%, 45%, and 55%, respectively.

FIGS. 6A-E show the effects of the flattening on pairs of neighboring burrs. In this figure, the sheet's rough side is on the left in all panels. As in FIGS. 4 and 5, the A panel shows un-flattened burrs while panels B-E show flattened burrs where the amount of flattening is the same as in the B-E panels of FIGS. 4 and 5, i.e., reductions in sheet thickness of 21%, 33%, 45%, and 55%, respectively. The photomicrographs of FIG. 6 were prepared by cutting a cross-section from a sheet and polishing the exposed edge.

The enhanced capture of slag by the filters disclosed herein can be understood from the geometry of the neighboring burrs shown in FIG. 6. As shown in FIG. 6A, gases passing from the right to the left in this figure (i.e., the path through a filter where the expanded metal is wound smooth side in) are guided into a relatively smooth flow by the walls 141 and 143 of perforation 11 which give the perforation a funnel-like shape as seen from the smooth side. If, on the other hand, the gas were to pass through the filter from the rough side, the gas would engage concave barriers 145 and 147 (i.e., concave as seen from the incoming gas), which unlike walls 141 and 143 on the smooth side, do not present a funnel-like shape for guiding gas flow, but instead present a pocket-like geometry in which slag can become captured. In addition, the barriers include three-dimensional gorges 149 which further enhance their slag-capturing ability. As a result of these geometric effects, the rough side has been found to be far better than the smooth side in collecting slag.

Figure 6A:
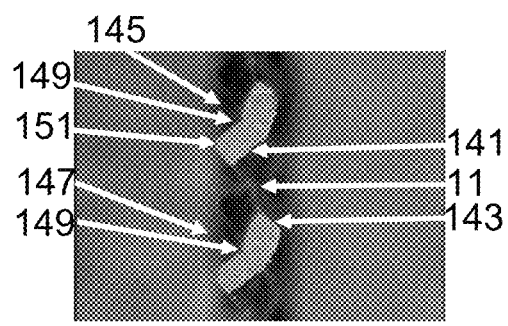
Figure 6B:
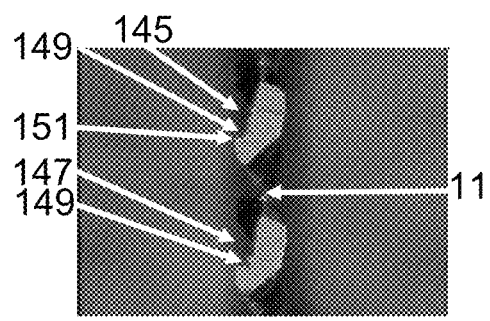
FIGS. 6B, 6C, 6D, and 6E show burrs where the thicknesses of the sheets of which the burrs are a part have been reduced by 21%, 33%, 45%, and 55%, respectively.
Figure 6C:
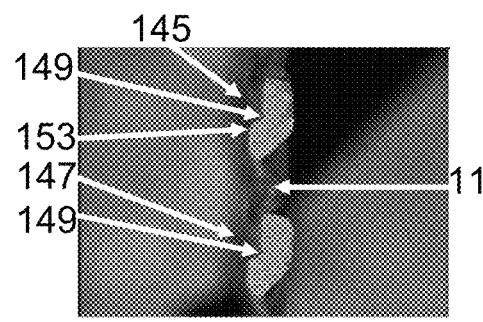
Figure 6D:
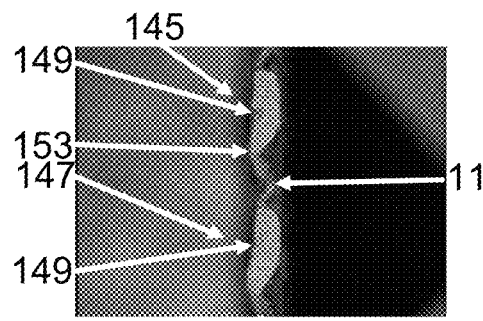
Figure 6E:
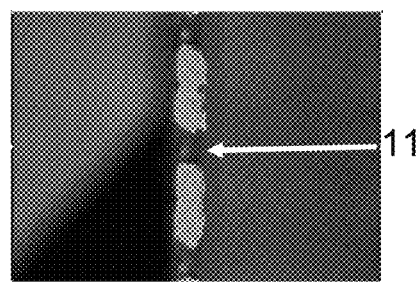

However, the rough side is the source of the cheese grater effect and thus, as discussed above, it cannot be oriented inward without compromising the service life of the inflator. Specifically, as shown in FIG. 6A (the un-flattened case), the rough side includes sharp corners 151 which stick out from the base surface at angles where they can engage the solid propellant and cause it to deteriorate. The challenge is then to retain the geometric features of the rough side that have been discovered to produce enhanced slag capture while at the same time minimizing the cheese grater effect. In accordance with this disclosure, this combination is achieved by controlling the amount of flattening applied to the expanded metal sheet. In particular, the amount of flattening is selected so that the reduction in sheet thickness produced by the flattening is in the range of 25-45% or one of the sub-ranges of that range discussed above.

Panels B-E of FIG. 6 illustrate the effects of different amounts of flattening. Specifically, panels B (21%) and E (55%) illustrate flattening levels outside of the 25-45% range, while panels C (33%) and D (45%) illustrate levels covered by the range. Beginning with panel C (33% reduction in thickness), it illustrates burrs that have been flattened enough so that they have rounded corners 153 which can contact the solid propellant without a substantial degradation in inflator service life, but have not been flattened to a point where the concave barriers 145 and 147 and their associated three-dimensional gorges 149 are no longer able to provide enhanced slag capture. Panel E (55% reduction in thickness) illustrates the effects of over-flattening. Both the concave barriers and the three-dimensional gorges have been flattened to a point where they cannot provide enhanced slag capture. Panel D (45% reduction in thickness) is intermediate between Panels C and E and still retains enough of concave barriers and three-dimensional gorges to achieve an improvement in slag capture compared to the existing state of the art, but not as large an improvement as Panel C. Panel B illustrates the other extreme of under-flattening in which the sheet still contains sharp corners that extend out from the plane of the sheet where they can contact and degrade the inflator's propellant.

In embodiments, rough-side-in filters produced by processes in which the level of flattening has been selected to fall within the ranges disclosed herein have been found to achieve a slag retention which satisfies the 1.0 gram requirement of USCAR when tested using the USCAR procedures (see SAE Standard USCAR24-2 entitled "Uscar Inflator Technical Requirements and Validation" issued Apr. 30, 2013). For example, rough-side-in filters flattened by 33% achieved a 0.7 gram level of slag retention, i.e., 30% below the 1.0 gram requirement of the USCAR standard. For comparison, a filter having the same construction and the same level of flattening but with the rough side facing out (the conventional orientation) released 1.3 grams of slag, i.e., it failed the 1.0 gram USCAR standard. This drop in the amount of slag released from the filter from 1.3 grams to 0.7 grams represents an improvement of 46%. In embodiments, the amount of slag released by filters having a flattened rough side oriented inward is at least 10% or at least 20% or at least 30% or at least 40% less than a filter having the same construction but with the flattened rough side oriented to face outward. Significantly, although they have their rough sides facing inward, filters in which the flattening is within the ranges disclosed herein also exhibit levels of the cheese grater effect that are low enough to be commercially acceptable.

In the manufacture of a filter for a vehicle airbag inflator, one filter geometry is a cylinder having porous walls. To make such a device, and continuing with FIG. 3, the flattened expanded metal sheet is cut by cutter 123 into individual strips 125. Strips having narrower widths can be formed using additional cutters (not shown). Individual strips, if long enough, can be rolled into a filter or multiple strips, possibly having different open areas, can be placed in an overlapping relationship as shown at 127 in FIG. 3 and attached to each other via a welder 129 (preferably by electric welding). The individual strip or the joined composite strip is then rolled into a cylinder 131 and the edge of the mesh secured to the cylinder by a welder 133. To produce the proper ID and OD (inner and outer diameters), the cylinder 135 can be placed into a female mold 137 optionally having a movable inner wall, and a mandrel 139 optionally expandable can be inserted into the central bore of the cylinder. The desired ID and OD of the final filter can be achieved by the combination of the mandrel, optionally expanding, and the mold, optionally contracting, to cold form the cylinder into the desired radial geometry and dimensions.

In an embodiment, when multiple strips of expanded metal are used to produce the filter, those strips can differ from one another in their perforation patterns including the orientations, shapes, sizes, and spacings between the perforations (e.g., the pitch between rows of perforations). In a preferred embodiment, at least one strip of variable expanded metal (VEM) having a non-constant perforation pattern is used. Such a strip can comprise all or substantially all of the filter. Commonly-assigned U.S. Pat. No. 10,717,032 discloses filters that employ variable expanded metal; the contents of this patent are incorporated herein in their entirety by reference. In addition to layers of expanded metal, the filter can include one or more layers or sections of other materials such as metal screens, ceramic fabrics, or the like.

In a typical application, the expanded metal strip is rolled upon itself to produce a structure having multiple layers, e.g., between three and twenty layers. For example, the filter can have between 10 and 15 layers. The first 360 degree wrap (first layer) can be secured with spot welds with the remaining layers being continuously wrapped around one another to reach the desired outside diameter. The outermost layer can then be secured with spot welds. Once completed, the filter can be installed within an inflator housing having a plurality of apertures which allow gases produced by the burning of the inflator's solid propellant to exit the housing and inflate the air bag which is secured about the outside of the housing. FIG. 8 is a schematic diagram showing the overall construction of an airbag assembly 155 comprising an inflator 157 which includes a filter 21 which houses a solid propellant 26 which when burned inflates an airbag or, in more general terms, an inflatable vehicle occupant protection device 159. Details of the construction of airbag assemblies are omitted since such assemblies are well known in the art.

From the foregoing it can be seen that the technology disclosed herein can provide safer airbag inflator filters that are cleaner by combining flattening of expanded metal sheets with wrapping of the sheets to form filters that have the expanded metal sheet's flattened rough side facing in. The filters can replace existing filter designs without compromising long established performance criteria, including both cooling and ballistic performance. The filters can clean the inflator's gas at a lower cost by using less filter layers and less filter mass. The filters can also be used to obtain an output gas that is cleaner.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

What is claimed is:

1. A method of making a filter for an airbag inflator comprising:
   (I) providing a sheet of expanded metal which has a smooth side and a rough side;
   (II) flattening the sheet of expanded metal, the flattening reducing the thickness of the sheet;
   (III) forming a strip of flattened expanded metal from the flattened sheet of expanded metal; and
   (IV) forming the filter by a method that comprises wrapping the strip of flattened expanded metal about an axis;
   wherein:
   (a) the filter has a cavity for receiving a solid propellant, said cavity having a surface that is capable of coming into contact with the solid propellant in an assembled airbag inflator;
   (b) the flattened strip of expanded metal comprises a flattened rough side; and
   (c) the flattened strip of expanded metal is wrapped so that at least a part of said surface of the cavity comprises a portion of the flattened rough side.

2. The method of claim 1 comprising selecting the amount of flattening in step (II) so as to reduce a cheese grater effect in which a solid propellant is deteriorated through contact with a rough side of expanded metal.

3. The method of claim 2 wherein prior to flattening the expanded metal sheet has a thickness t and the amount of flattening selected in step (II) reduces t by 25-45%.

4. The method of claim 3 wherein the amount of flattening reduces t by 30-40%.

5. The method of claim 3 wherein the amount of flattening reduces t by 30-35%.

6. The method of claim 1 comprising selecting the amount of flattening in step (II) so that the flattened rough side comprises concave barriers capable of capturing slag during use of the filter in an airbag inflator.

7. The method of claim 6 wherein the amount of flattening is selected so that at least some of the concave barriers comprise a three-dimensional gorge.

8. A filter for an airbag inflator comprising a strip of expanded metal rolled-up about an axis to form multiple rolled layers said filter comprising a cavity for receiving a solid propellant said cavity having a surface that is capable of coming into contact with the solid propellant in an assembled airbag inflator, wherein:
   (a) the strip of expanded metal comprises a flattened smooth side and a flattened rough side; and
   (b) the strip of expanded metal is rolled-up so that (i) the flattened rough side faces inward towards the cavity and (ii) at least a part of the surface of the cavity comprises a portion of the flattened rough side.

9. The filter of claim 8 wherein the flattened rough side comprises concave barriers capable of capturing slag during use of the filter in an airbag inflator.

10. The filter of claim 9 wherein at least some of the concave barriers comprise a three-dimensional gorge.

11. The filter of claim 8 wherein the filter releases less slag than a filter having the same construction but with the strip of expanded metal rolled-up so that the flattened rough surface faces away from the cavity.

12. The filter of claim 11 wherein the filter releases at least 10% less slag.

13. The filter of claim 11 wherein the filter releases at least 20% less slag.

14. The filter of claim 8 wherein the filter causes substantially the same or less degradation of a solid propellant by a cheese grater effect than a filter having the same construction but with the strip of expanded metal rolled-up so that the flattened rough surface faces away from the cavity.

15. An apparatus for helping to protect an occupant of a vehicle comprising:
  (I) an inflatable vehicle occupant protection device; and
  (II) an inflator that is actuatable to provide inflation fluid for inflating the inflatable vehicle occupant protection device;
  wherein the inflator comprises:
  (A) a solid propellant that is susceptible to degradation through contact with a rough surface; and
  (B) a filter that comprises a flattened strip of expanded metal rolled-up about an axis to form multiple rolled layers, said filter having an inner surface and an outer surface;
  wherein:
  (i) the flattened strip of expanded metal has a flattened smooth side and a flattened rough side;
  (ii) the flattened strip of expanded metal is rolled-up so that the strip's flattened smooth side is outward and its flattened rough side is inward;
  (iii) at least part of the filter's inner surface comprises the flattened rough side; and
  (iv) at least part of the solid propellant and the filter's inner surface are in contact in the assembled inflator, said contact occurring prior to actuation of the inflator.

16. The apparatus of claim 15 wherein the flattened rough side comprises concave barriers capable of capturing slag.

17. The apparatus of claim 16 wherein at least some of the concave barriers comprise a three-dimensional gorge.

18. The apparatus of claim 15 wherein the filter releases less slag than a filter having the same construction but with the strip of expanded metal rolled-up so that instead of a portion of the flattened rough side, a portion of the flattened smooth side comprises at least a part of the filter's inner surface.

19. The apparatus of claim 18 wherein the filter releases at least 10% less slag.

20. The apparatus of claim 15 wherein the filter causes substantially the same or less degradation of a solid propellant by a cheese grater effect than a filter having the same construction but with the strip of expanded metal rolled-up so that instead of a portion of the flattened rough side, a portion of the flattened smooth side comprises at least a part of the filter's inner surface.

* * * * *